United States Patent [19]

Nakamura et al.

[11] Patent Number: 4,792,739

[45] Date of Patent: Dec. 20, 1988

[54] HIGH-ACCURACY POSITION DETECTION APPARATUS

[75] Inventors: Ritaka Nakamura; Akihiko Kuroiwa, both of Fuchu, Japan

[73] Assignee: Kabushiki Kaisha Toshiba, Kawasaki, Japan

[21] Appl. No.: 104,987

[22] Filed: Oct. 6, 1987

[30] Foreign Application Priority Data

Jan. 9, 1987 [JP] Japan .................................... 62-1728
Feb. 16, 1987 [JP] Japan .................................. 62-31406

[51] Int. Cl.$^4$ .............................................. G05B 5/01
[52] U.S. Cl. ..................................... 318/661; 318/616; 318/632; 318/630
[58] Field of Search ............... 318/616, 632, 630, 661, 318/608

[56] References Cited

U.S. PATENT DOCUMENTS

| | | | |
|---|---|---|---|
| 3,184,662 | 5/1965 | Wallace | 318/630 X |
| 4,196,380 | 4/1980 | Gustausson et al. | 318/630 |
| 4,221,998 | 9/1980 | Haught et al. | 318/661 |
| 4,358,722 | 11/1982 | Iwakane et al. | 318/616 X |
| 4,472,669 | 9/1984 | Denham et al. | 318/632 X |
| 4,527,120 | 7/1985 | Kurosawa | 318/661 X |
| 4,556,885 | 12/1985 | Kurosawa | 318/661 X |
| 4,651,272 | 3/1987 | El-Ibary | 318/632 X |
| 4,707,780 | 11/1987 | Gose et al. | 318/632 X |

FOREIGN PATENT DOCUMENTS

5465880 7/1980 Australia .
3379184 4/1985 Australia .
8097175 11/1986 Australia .

Primary Examiner—Benjamin Dobeck
Attorney, Agent, or Firm—Oblon, Fisher, Spivak, McClelland, & Maier

[57] ABSTRACT

A high-accuracy position detection apparatus comprises a position detector for detecting a position signal indicating the rotation position of a motor; a coupler for coupling the motor to the position detector with a certain eccentricity; a coupling eccentricity detector, connected to the position detector, for detecting an eccentricity signal, corresponding to a coupling eccentricity of the coupler, from the position detection signal; and a true position signal synthesizer, connected to the position detector and the coupling eccentricity detector, for combining the position signal with the eccentricity signal so as to produce a true position signal which indicates the true position of the motor and is independent of the coupling eccentricity of the coupler.

14 Claims, 7 Drawing Sheets

HIGH-ACCURACY POSITION DETECTION APPARATUS

BACKGROUND OF THE INVENTION

The present invention relates to a position detection apparatus for detecting the rotation position of a rotary member such as a motor, or the position of an object which is periodically or repetitively moved.

An apparatus using a position detector such as an optical encoder or resolver is known, which can detect the rotation position of, for example, a motor. The rotating shaft of the position detector is coupled to a rotating shaft of a motor via a mechanical joint. For this reason, when in use, eccentricity inevitably occurs between these rotating shafts. Any position signal received by the position detector includes a rotating shaft eccentricity signal which at any time is equal to the rotation frequency of the motor and has a given amplitude, due to the eccentricity of the rotating shafts. A differentiated position signal, obtained by differentiating the detected position signal over time, is utilized for controlling the speed of the motor. However, the rotating shaft eccentricity signal cannot be removed by this differentiation process. If speed control is performed using the differentiated position signal, a ripple component corresponding to the eccentricity of the rotating shafts is generated. The ripple component noticeably degrades the performance of the controllability of the motor speed.

SUMMARY OF THE INVENTION

It is an object of the present invention to provide a position detection apparatus wherein any eccentricity of a coupled rotating shaft of a position detector is compensated for, so that a position detection signal free from the influence of the eccentricity can be obtained, despite any eccentricity of the coupled rotating shaft.

It is another object of the present invention to provide a position detection apparatus wherein any eccentricity of a coupled rotating shaft of a position detector is electrically and automatically compensated for, so that a position detection signal free from the influence of the eccentricity of the coupled rotating shaft can be obtained, regardless of the eccentric state thereof.

In order to achieve the first object, in a position detection apparatus of the present invention, a deviation ($\Delta\theta$) between the position detection signal ($\theta A$ or $\theta B$), including a ripple component arising from the eccentricity of a coupled rotating shaft, and a predetermined signal (PGT), obtained when there is no eccentricity, is detected. The ripple component in the position detection signal ($\theta A$ or $\theta B$) is canceled by the deviation ($\Delta\theta$), thus enabling a position detection signal free from the influence of the eccentricity of the coupled rotating shaft.

To achieve the second object, in a position detection apparatus of the present invention, a linear approximation signal (ytn), obtained by linear-approximating one period (or N periods; N is an integer) of the eccentricity, is detected from a position detection signal ($\theta A$ or $\theta B$) including a ripple component arising from the eccentricity of a coupled rotating shaft, provided that the speed of the rotating shaft is substantially constant. The linear approximation signal (ytn) is corrected to a predetermined linear signal (PGT) which would be obtained were there no eccentricity of the coupled rotating shaft. A deviation ($\Delta\theta$) between the position detection signal ($\theta A$ or $\theta B$) including the ripple component and the predetermined linear signal (PGT) is detected. The ripple component in the position detection signal ($\theta A$ or $\theta B$) is cancelled by the deviation ($\Delta\theta$), thus enabling a position detection signal free from the influence of the eccentricity of the coupled rotating shaft.

DETAILED DESCRIPTION OF THE PREFERRED EMBODIMENTS

Embodiments of the present invention will now be described, with reference to the accompanying drawings. For the sake of simplicity, common or similar portions are denoted by common or similar reference numerals in the following description.

A position detection apparatus using a resolver as a position detection means will now be described with reference to FIG. 1.

In the position detection apparatus, motor 10, as an object to be detected, is coupled via mechanical joint 12 to resolver 14 for detecting the rotation position of motor 10. Detection signal $\theta A$ from resolver 14 is converted by converter 16 to rotation angle signal $\theta B$ Rotation angle signal $\theta B$ from converter 16 is input to compensator 20, which outputs preset compensation value signal $\Delta\theta$ which is in one-to-one correspondence with rotation angle signal $\theta B$. Compensation value signal $\Delta\theta$ from compensator 20 is added by adder 18 to rotation angle signal $\theta B$ from converter 16, thereby compensating for rotation angle signal $\theta B$. In this manner, the true rotation position $\theta RT$ of motor 10 can be obtained from adder 18.

Figure 1:
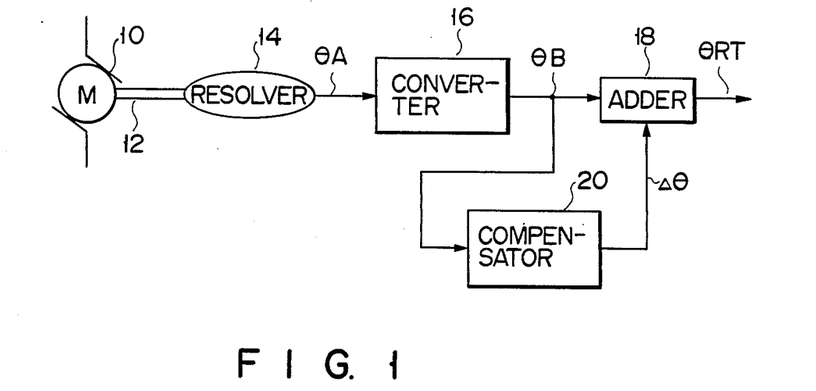
FIG. 1 is a block diagram showing a basic arrangement of a position detection apparatus according to an embodiment the present invention.
Figure 2:
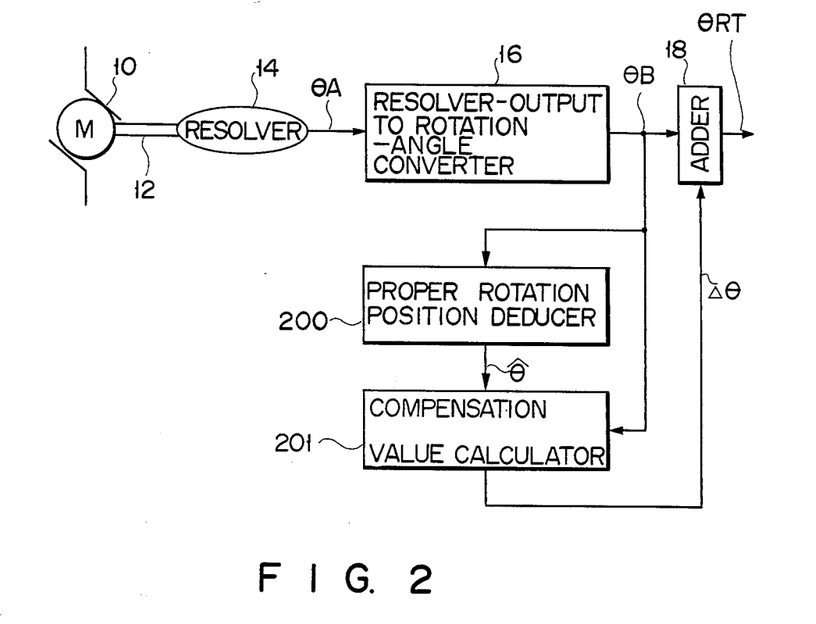
FIG. 2 is a block diagram showing in detail the arrangement shown in FIG. 1.

FIG. 2 is a block diagram showing in detail the arrangement shown in FIG. 1. In the position detection apparatus shown in FIG. 2, detection signal $\theta A$ from resolver 14 is converted to rotation angle signal $\theta B$ by resolver-output-to-rotation-angle converter (to be referred to as R/T converter) 16. True rotation position deducer 200 simulates linear function PGT, which represents the deduced true rotation position of motor 10, based on rotation angle signal $\theta B$ from R/T converter 16 and detection time t of signal $\theta B$. Deviation $\Delta \theta$ between output signal $\hat{\theta}$ from deducer 200 and rotation angle signal $\theta B$ from converter 16 is calculated by compensation value calculator 201. Compensation value signal $\Delta \theta$ from compensation value calculator 201 is added by adder 15 to rotation angle signal $\theta B$ from converter 16, thereby enabling the true rotation position function $\theta RT$ of motor 10 to be calculated.

The operation of the position detection apparatus having the above arrangement will now be described with reference to FIG. 3. First, detection signal $\theta A$ of the rotation position of motor 10, detected by resolver 14 which is mechanically coupled thereto, is converted by converter 16 to rotation angle signal $\theta B$.

Figure 3:
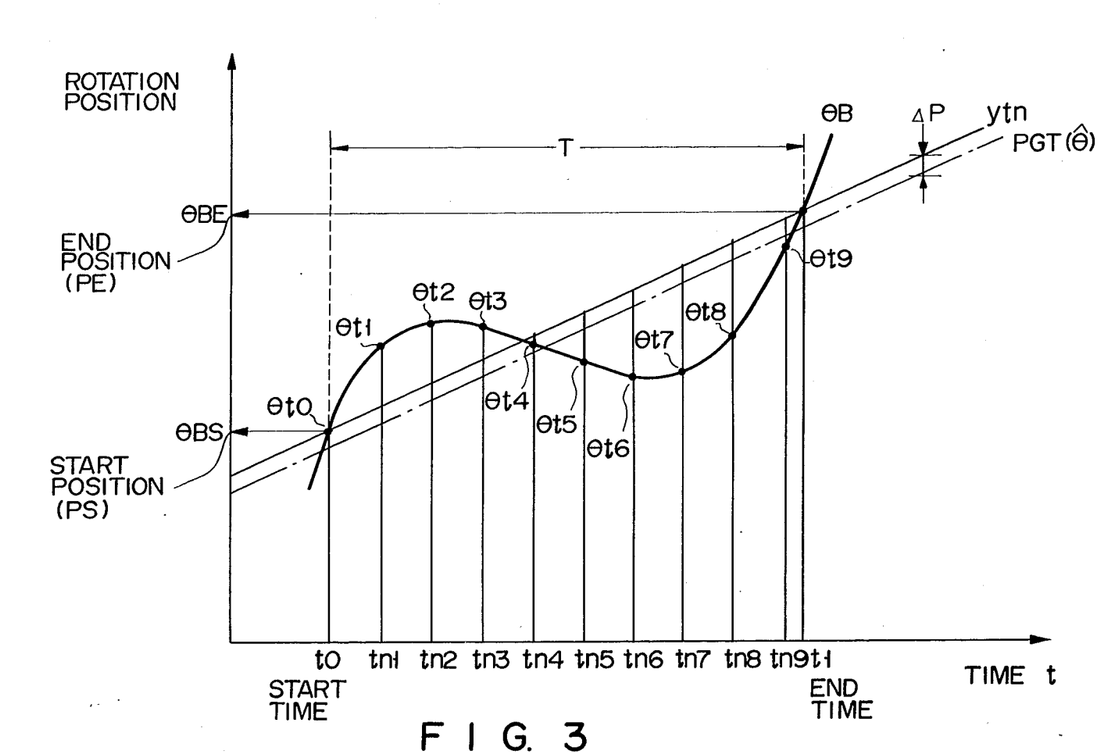
FIG. 3 is a graph for exemplifying a change of one period of a position detection signal ($\theta B$) over time, obtained by the arrangement shown in FIG. 2.

Rotation position ytn of motor 10 is simulated in accordance with the following equations, using rotation angle signal $\theta B$ in true rotation position deducer 200, based on time $t\theta$, at which the rotation position of motor 10 is at rotation start point PS, rotation start position $\theta BS$ at time t0, time t1, at which the rotation position is at rotation end point PE, and rotation end position $\theta BE$ at time t1:

$$\theta BS = at0 + b \quad (1)$$

$$\theta BE = at1 + b \quad (2)$$

$$ytn = \{(\theta BE - \theta BS)/(t1 - t0)\} \cdot tn + \{(t1\theta BS - t0\theta BE)/(t1 - t0)\} \quad (3)$$

where ytn is the deduced rotation position, and tn is the detection time (tn=tn1 to tn9 in FIG. 3).

A deviation ($\theta tn - ytn$) between deduced rotation position ytn at time tn and signal $\theta B$ is obtained by deducer 200, in accordance with equation (3), based on rotation angle signal $\theta B$ obtained from converter 16 during a single rotation of motor 10 (period T) and time tn, at which rotation angle signal $\theta B$ is detected or sampled. The obtained deviation is averaged to form linear equation PGT, which represents a deduced true rotation position. The linear equation is obtained as follows:

$$\Delta P = \left( \sum_{t=t0}^{t1} (\theta tn - ytn) \right) / (n - 1) \quad (4)$$

where $\Delta P$ denotes a deviation compensation value, tn denotes the detection time, t0 denotes the time at which the rotation position of motor 10 is present at rotation start point PS, and t1 denotes the time at which the rotation position of motor 10 is present at a rotation end point after a single rotation from rotation start point PS. $\theta tn$ denotes the rotation angle signal ($\theta A$ or $\theta B$) detected at time tn, ytn denotes the deduced rotation position signal at time tn, and n is the number of detection times (or the number of sampling times of tn).

From equations (3) and (4), deduced true rotation position function PGT of motor 10 is simulated in accordance with the following equation:

$$\begin{aligned} PGT &= ytn + \Delta P \\ &= \{(\theta BE - \theta BS)/(t1 - t0)\} \cdot tn + \\ &\quad \{(t1\theta BS - t0\theta BE)/(t1 - t0)\} + \\ &\quad \left( \sum_{t=t0}^{t1} (\theta tn - ytn) \right) / (n - 1) \end{aligned} \quad (5)$$

From equation (5), deduced true rotation position function PGT of motor 10 can be calculated by deducer 200. Deducer 200 supplies signal $\hat{\theta}$ corresponding to function PGT to compensation value calculator 201.

Calculator 201 calculates deviation $\Delta \theta$ between output signal $\hat{\theta}$ from deducer 200 and rotation angle signal $\theta B$ from converter 16, thereby deriving a calibrated compensation value:

$$\Delta \theta = \theta B - \hat{\theta} \quad (6)$$

The compensation value representing deviation $\Delta \theta$ is added by adder 18 to rotation angle signal $\theta B$ from converter 16, whereby true rotation position $\theta RT$ of motor 10 is obtained, free from the influence of the ripple component arising from the eccentricity of joint 12.

Conventionally, an error in mounting (joint eccentricity of joint 12) the resolver inevitably occurs due to machining precision, and this prevents any improvement in position detection precision. In the embodiment shown in FIG. 2, a compensation value corresponding to the error is automatically generated and calibrated. As a result, position detection precision, better than machining precision of the joint between the motor and the resolver, can be obtained.

In this embodiment, the resolver serves as the position detection means. The present invention can be applied to an optical position detecting apparatus (e.g., an optical encoder) The present invention can also be applied to a speed detector for detecting position signal ($\theta A$ or $\theta B$) at predetermined time intervals, and for ascertaining the operating speed of an object (such as a motor) on the basis of the amount of the movement of the object during this interval.

A speed detector apparatus, to which the position detection apparatus of the present invention is applied, will now be described, with reference to FIG. 4.

Figure 4:
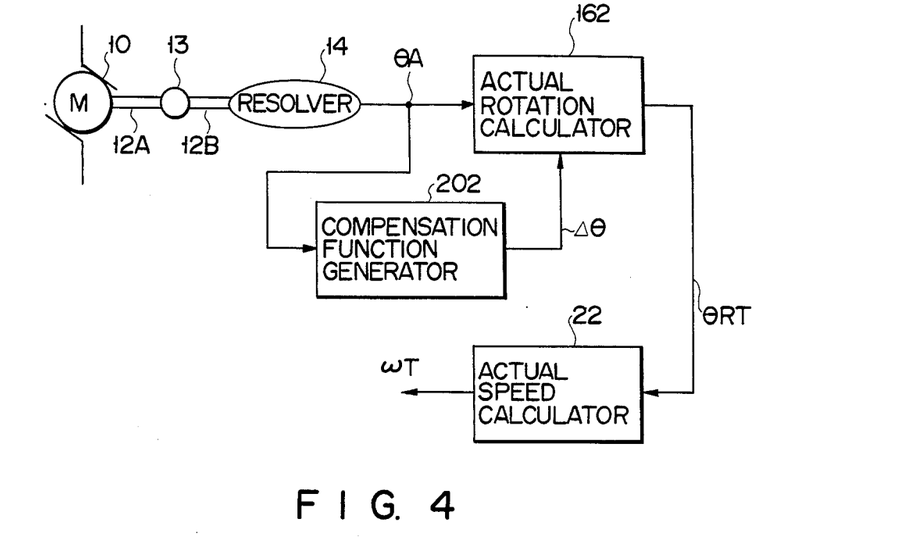
FIG. 4 is a block diagram showing a basic arrangement of a position detection apparatus according to another embodiment of the present invention.

As is shown in FIG. 4, rotation angle $\theta A$ of motor 10, to be detected, is detected by resolver 14 of the speed detector. Rotating shaft 12A of motor 10 is coaxially fixed to detection shaft 12B of resolver 14 via coupler 13. Compensation angle $\Delta \theta$ is generated from compensation function generator 202, as a function of output signal $\theta A$, based on output signal $\theta A$ from resolver 14. Output signal $\Delta \theta$ from generator 202 is subtracted, by actual position calculator 162, from output signal $\theta A$ from resolver 14, whereby actual rotation angle $\theta RT$ of motor 10 is obtained. Output signal $\theta RT$ from calculator 162 is differentiated by actual speed calculator 22, thereby calculating actual rotation speed $\omega T$ of motor 10. (Note that components 162+202 in FIG. 4 correspond to components 16+18+200+202 in FIG. 2.)

Figure 5:
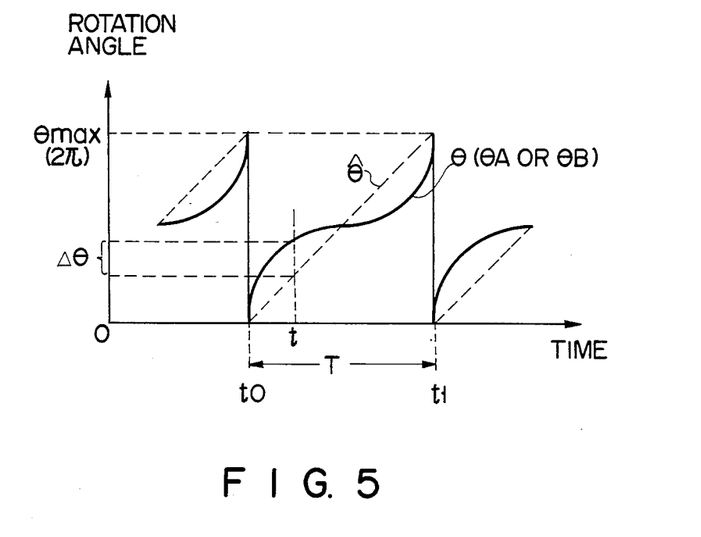
FIG. 5 is a waveform chart for explaining the operation of FIG. 4, etc.

If, in the speed detector with the above arrangement, motor 10 is rotated at a constant speed, rotation angle $\theta$ (or $\theta A$) can be detected by resolver 14 as a sine waveform, indicated by a solid curve in FIG. 5. Detected rotation angle $\theta$ is input into compensation function generator 202 having a compensation table corresponding to rotation angle $\theta$, and compensation angle $\Delta\theta$ is calculated thereby. Calculated compensation angle $\Delta\theta$ is subtracted from rotation angle $\theta A$ detected by resolver 14, whereby rotation angle $\theta RT$ of motor 10, corresponding to the actual amount of rotation, is obtained. Rotation angle $\theta RT$ is differentiated over time by calculator 22, to thereby produce actual rotation speed $\omega T$ of motor 10.

When, in the above speed detector, the compensation angle is preset in a fixed compensation table in calculator 202, then if coupler 13 coaxially coupling motor 10 and resolver 14 is detached and thereafter is recoupled, coupled, a problem occurs. Specifically, if the mounting position of coupler 13 is changed upon recoupling, a compensation function in the compensation table, which has been determined prior to re-coupling, must then be reset. If not, resultant rotation angle $\theta RT$ includes a ripple component. When a position detector in which angle signal $\theta A$ represents N rotations (N is a natural number) upon single rotation of motor 10 is used, the rotation position of motor 10 cannot be detected upon ON/OFF of the power source of the apparatus shown in FIG. 4, and a compensation function entered into the compensation table cannot be used.

Figure 6:
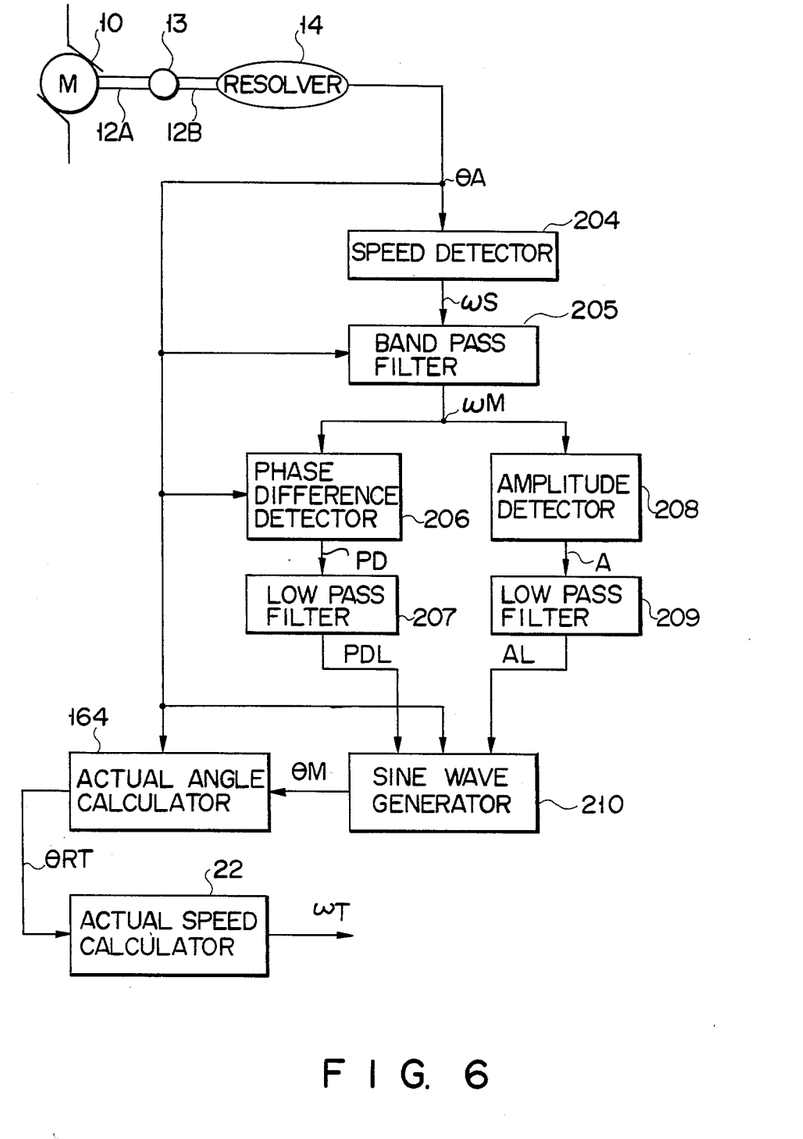
FIG. 6 is a block diagram showing a detailed arrangement of FIG. 4.
Figure 7:
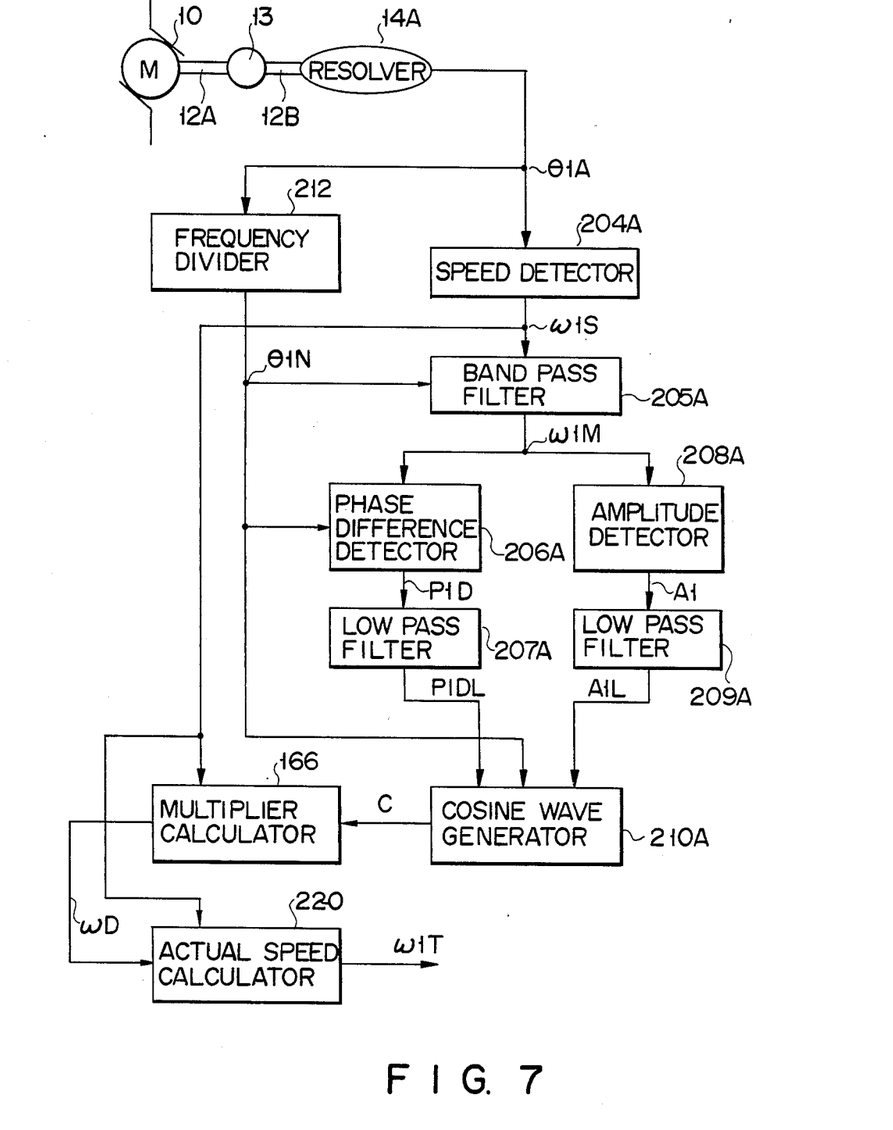
FIG. 7 is a block diagram showing another detailed arrangement of FIG. 4.

FIGS. 6 and 7 show position detection apparatuses which are free of the above-mentioned drawbacks. (Although a speed detector free from the above drawbacks can be realized by differentiating output signal $\theta RT$, shown in FIG. 2 over time, a new embodiment will be described hereinafter.)

The position detection apparatus shown in FIG. 6 has resolver 14 for detecting rotation angle $\theta A$ of motor 10, and coupler 13 for coaxially coupling rotating shaft 12A of motor 10 with detection shaft 12B of resolver 14. Output signal $\theta A$ from resolver 14 is differentiated by speed detector 204, and is output as speed signal $\omega S$. Band-pass filter 205 extracts, from output signal $\omega S$, error signal $\omega M$ having the same frequency as that of output signal $\theta A$ from resolver 14. Phase difference PD between output signal $\theta A$ from resolver 14 and output signal $\omega M$ from band-pass filter 205 is detected by phase difference detector 206. A low-frequency component of output signal PD from detector 206 is extracted by low-pass filter 207. The amplitude of output signal $\omega M$ from filter 205 is divided, together with output signal $\omega S$ from detector 204, by amplitude detector 208. The low-frequency component of output signal A from detector 208 is extracted by low-pass filter 209.

Output signal $\theta A$ from resolver 14, output signal PDL from low-pass filter 207, and output signal AL from low-pass filter 209 are input to sine wave generator 210, thereby calculating error angle signal $\theta M$ included in output signal from $\theta A$ resolver 14. Output signal $\theta M$ from generator 210 is subtracted from output signal $\theta A$ from resolver 14 by actual angle calculator 164, thus calculating actual angle signal $\theta RT$ which has the same frequency as the rotation speed of motor 10 and does not include an angular error. Output signal $\theta RT$ from calculator 164 is differentiated over time by actual speed calculator 22, and as a result, actual speed signal $\omega T$ of motor 10 is calculated.

In the speed detection apparatus having the above arrangement, the speed of motor 10 is calculated as follows:

Angle signal $\theta A$ detected by and output from resolver 14 includes angular error $\theta M$ due to eccentricity of detection shaft 12B to the center of rotating shaft 12A, with respect to actual rotation angle $\theta R$ of motor 10.

Since angular error $\theta M$ is synchronous with angle signal $\theta A$, the following equation can be established (where $\theta = \theta A$, in FIG. 1, $\theta = \theta B$ can be adopted):

$$\theta = \theta RT + \theta M = \theta RT + AL\sin(\theta + PDL) \quad (7)$$

where A1: the amplitude of angular error $\theta M$, and PDL: a phase.

When angle signal $\theta(=\theta A)$ is differentiated over time, speed signal $\omega S$ including angular error $\theta M$ can be obtained by the following equation:

$$\omega S = d\theta/dt = (d\theta RT/dt) + (d\theta M/dt) \quad (8)$$
$$= \omega T + \omega TAL \cdot \cos(\theta + PDL)$$

Therefore, when only the speed signal (angular error component) of the second term of the right side of equation (8) is detected, speed error $\omega M$ can be obtained by the following equation:

$$\omega M = \omega T \cdot AL \cdot \cos(\theta + PDL) \quad (9)$$

Phase PDL and amplitude AL obtained from equation (9) are constants determined by the eccentricity of detection shaft 12B with respect to rotating shaft 12A, and hence, can be treated as DC signals.

When phase difference PD and amplitude A are filtered through low-pass filters 207 and 209, an unnecessary component corresponding to a detection error can be removed from from PDL and AL. Furthermore, PDL and AL can be gradually detected during rotation of motor 10.

Phase PDL and amplitude AL filtered through low-pass filters 207 and 209 and angle signal $\theta(=\theta A)$ are input to sine wave generator 210, so that angular error $\theta M$ is obtained by the following equation:

$$\theta M = AL \cdot \sin(\theta + PDL) \quad (10)$$

Angular error $\theta M$ obtained from equation (10) can be subtracted from angle signal $\theta(=\theta A)$ as a compensation signal so as to obtain actual angle signal $\theta RT$ of motor 10.

Finally, angle signal $\theta RT$ is differentiated over time, and actual speed signal $\omega T$ from which an error having the same frequency as that of the rotation speed caused by the eccentricity of detection shaft 12B with respect to rotating shaft 12A is removed can be obtained from the following equation:

$$\omega T = d\theta T/dt = (d/dt)(\theta - \theta M) \quad (11)$$

So as to improve the detection precision when motor 10 is rotating at low-speed, and when a resolver is used whose angle signal $\theta$ represents N rotations per 10 rotations of motor 10, detected angle signal $\theta$ can be frequency-divided by N, using the following equation, so that actual speed $\omega T$ can be detected by means of the above equations (7) to (11):

$$\theta = N \cdot (\theta RT \cdot \theta M) \quad (12)$$

(where N is an integer equal to or greater than 2)

Another embodiment of the present invention, in which frequency division by N is performed, will now be described, with reference to FIG. 7.

The speed detection apparatus shown in FIG. 7 employs resolver 14A whose angle signal $\theta(=\theta 1A)$ represents sents N rotations per rotation of motor 10. Rotating shaft 12A of motor 10 is coaxially fixed to detection shaft 12B of resolver 14A via coupler 13. Output signal $\theta 1A$ from resolver 14A is frequency-divided by N, by frequency divider 212. Output signal $\theta 1A$ from resolver 14A is differentiated by speed detector 204A, to thereby be converted to speed signal $\omega 1S$. Band-pass filter 205A detects, from output signal $\omega 1S$, error signal $\omega 1M$ having the same frequency as that of output signal $\theta 1N$ from frequency divider 212. Phase difference P1D between output signal $\omega 1M$ from filter 205A and output signal $\theta 1N$ from frequency divider 212 is detected by phase difference detector 206A.

The low-frequency component of output signal P1D from detector 206A is extracted by low-pass filter 207A. The amplitude of output signal $\omega 1M$ from band-pass filter 205A is divided, together with output signal $\omega 1S$ from detector 204A, by amplitude detector 208A. The low-frequency component of output signal A1 from detector 208A is extracted by low-pass filter 209A. Cosine wave generator 210A generates cosine wave signal C having amplitude A1L, based on output signal A1L from low-pass filter 209A, output signal P1DL from another low-pass filter 207A, and output signal $\theta 1N$ from frequency divider 212. Cosine wave signal C from generator 210A and output signal $\omega 1S$ from detector 204A are multiplied with one another by multiplier calculator 166. Output signal $\omega D$ from calculator 166 is subtracted from output signal $\omega 1S$ from detector 204A by actual speed calculator 220, whereby actual speed signal $\omega 1T$ of motor 10 is obtained.

In the speed detection apparatus having the above arrangement, speed detection is performed as follows:

Angle signal $\theta 1A$ detected by and output from resolver 14A includes angular error $\theta M$, with respect to actual rotation angle $\theta RT$ of motor 10, as a result of the eccentricity between rotating shaft 12A and detection shaft 12B. Since angular error $\theta M$ is synchronous with angle signal $\theta 1A$, the following equation can be established:

$$\theta 1A = \theta RT + \theta M \qquad (13)$$
$$= \theta RT + A1L \cdot \sin(\theta 1A + P1DL)$$

where AL: the amplitude of angular error $\theta M$, and P1DL: the phase of the second right term of equation (13).

Therefore, when angle signal $\theta 1A$ is differentiated over time, speed signal $\omega 1S$ including angular error $\theta M$ can be obtained by the following equation:

$$\omega 1S = d\theta 1A/dt = (d\theta RT/dt) + (d\theta M/dt) \qquad (14)$$
$$= \omega 1T + \omega 1T \cdot A1L \cdot \cos(\theta 1A + P1DL)$$

Speed error $\omega D$ can be calculated from the second term of the right side of equation (14), by means of the following equation:

$$\omega D = \omega 1T \cdot A1L \cdot \cos(\theta 1A + P1DL) \qquad (15)$$

In this embodiment, $\omega 1S$ can be used in place of $\omega 1T$ of the second term of the right side.

Since $$\omega 1S \cdot A1L \cdot \cos(\theta 1A + P1DL)$$
$$= (\omega 1T + \omega D) \cdot A1L \cdot \cos(\theta 1A + P1DL) \qquad (16)$$
$$= (\omega 1T + \omega D) \cdot (\omega D/\omega 1T)$$
$$= \omega D + (\omega n^2/\omega 1T)$$

$\omega D^2/\omega 1T$ becomes a negligible small value.

Therefore, from equations (14) and (16), $$\omega 1T = \omega 1S - \omega 1S \cdot A1L \cdot \cos(\theta 1A + P1DL) \qquad (17)$$
$$= \omega 1S - \omega D$$

More specifically, output signal $\omega D$ from multiplier calculator 166 is subtracted from output signal $\omega 1S$ from detector 204A, so that actual speed $\omega 1T$, which does not include speed error $\omega D$, arising from angular error $\theta M$ having the same frequency as that of the rotational speed of motor 10, can be obtained.

As has been described above, the speed detection apparatus of the present invention can gradually detect an error, having the same frequency as that of the rotation speed of the motor and caused by the joint eccentricity between the motor and the resolver, as a DC value during rotation of the motor. Therefore, a compensation function need not be set, and the speed of the motor can be detected with high accuracy.

The following U.S. Patents can be utilized in the present invention:

(1) U.S. Pat. No. 4,527,120 (July 2, 1985); Kurosawa
(2) U.S. Pat. No. 4,556,885 (Dec. 3, 1985); Kurosawa All disclosures of the above U.S. Patents are incorporated in the present application.

Figure 8:
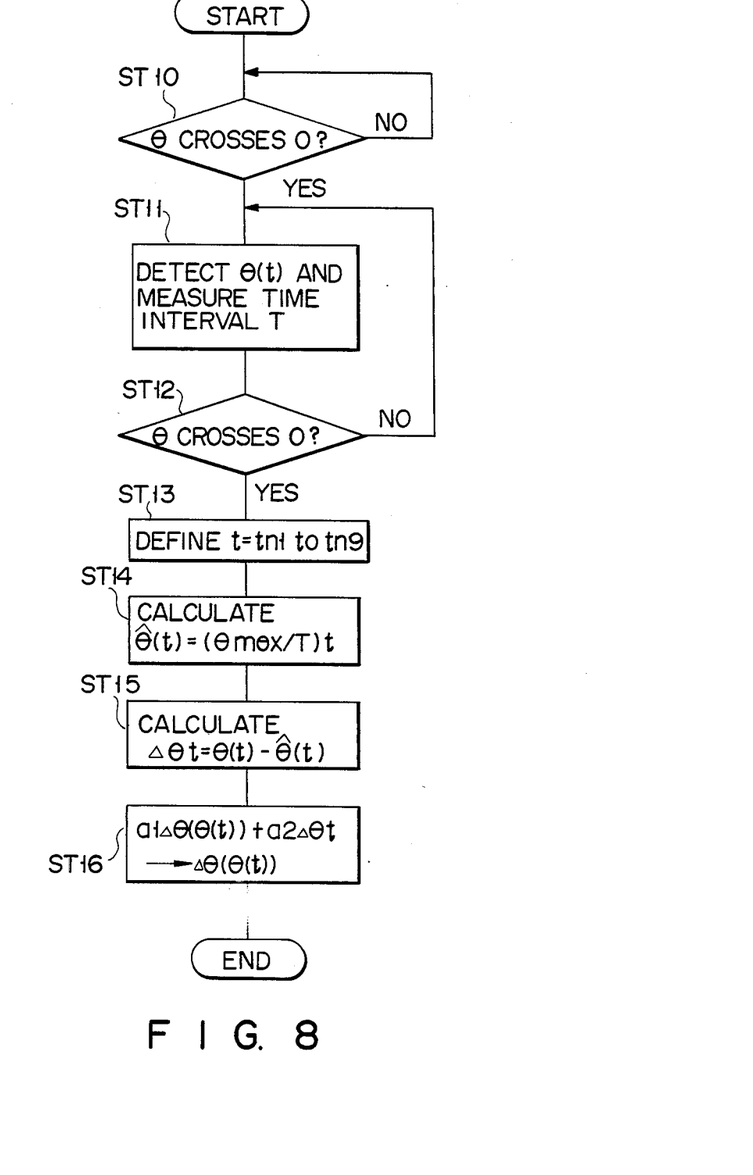
FIG. 8 is a flow chart showing a sequence for obtaining a deviation ($\Delta\theta$) with respect to a predetermined function (PGT or $\theta$) of the position detection signal ($\theta B$, $\theta$) by sampling the position detection signal ($\theta B$, $\theta$) shown in 3 or 5.

FIG. 8 is a flow chart showing a sequence for obtaining a compensation angle (deviation $\Delta\theta$) in the arrangement shown in FIGS. 1 or 4. Since this sequence can be applied to either arrangement of FIGS. 1 and 4, angle signals $\theta A$ and $\theta B$ are represented as $\theta$ in this flow chart. The flow chart will now be described, with reference to FIG. 5. (Note that the sequence of this flow is executed by a conventional microcomputer (not shown). The microcomputer is incorporated in compensator 20, shown in FIG. 1, or in function generator 202, shown in FIG. 4.)

When angle signal $\theta$ crosses zero level at time t0, as shown in FIG. 5, the zero cross timing is detected (ST10, YES). Values $\theta(t)$ of angle signals $\theta$ at some sampling timings (tn1 to tn9 in FIG. 3) from time t1 to time t1 are detected, and time interval from time t0 to time t1 is measured (ST11). The detection operation is repeated until another zero cross of angle signal $\theta$ is detected (ST12, NO).

When another zero cross of angle signal $\theta$ is detected (ST12, YES), sampling time t (tn1 to tn9 in FIG. 3) during time interval T is defined as a parameter for the following calculations (ST13). Then, deduced true rotation position signal $\hat{\theta}(t)$ (corresponding to PGT in FIG. 3) is calculated, based on data in time interval T and sampling times t obtained in steps ST11 and ST13 and maximum value $\theta max$ of angle signal $\hat{\theta}(\theta(t)) = (\theta max/T \cdot t)$ in step ST14). Then, deviation $\Delta\theta t$ is calculated from $\theta(t)$ and $\hat{\theta}(t)$ obtained in steps ST11 and ST14 ($\Delta\theta t = \hat{\theta}(t) - \theta(t)$) In step ST15. Finally, new compensation angle data $\Delta\theta(\theta(t))$ is calculated from predetermined weighting data a1 and a2, deviation $\Delta\theta t$ obtained in step ST15, and old compensation angle data $\Delta\theta(\theta(t))$ $(a1\Delta\theta(t))+a2\Delta\theta t\rightarrow\Delta\theta(\theta(t)))$ in step ST15).

Resultant final compensation angle data $\Delta\theta(\theta(t))$ is used as the compensation angle (deviation $\Delta\theta$) in the arrangement shown in FIGS. 1 or 4.

Figure 9:
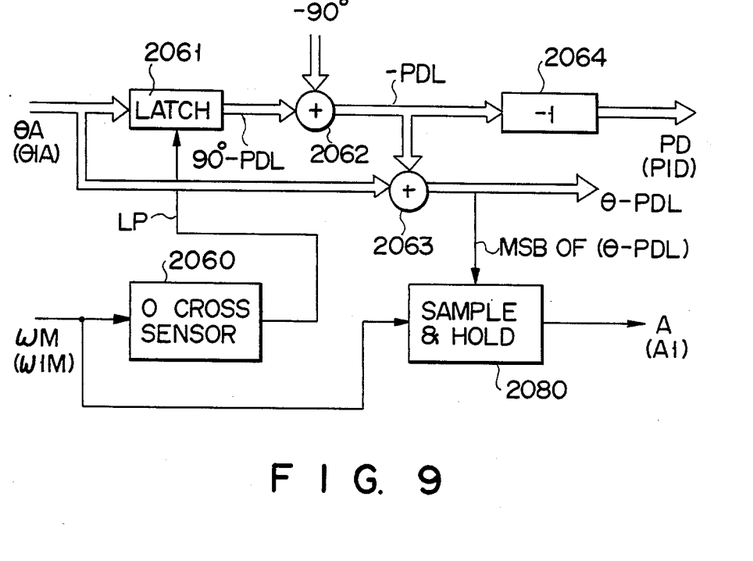
FIG. 9 is a block diagram for exemplifying a detailed arrangement of a detector (206, 208) shown in FIG. 6 or a detector (206A, 208A) shown in FIG. 7.
Figure 10A:
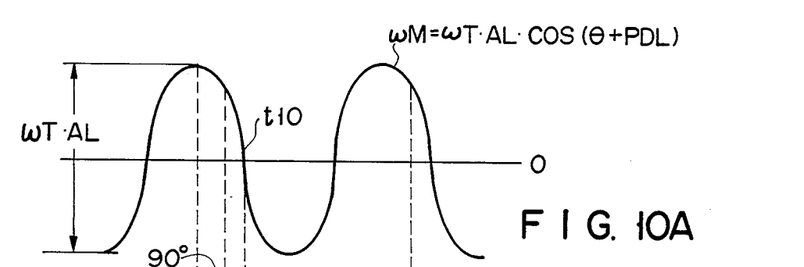
FIGS. 10A and 10B are waveform charts for explaining the operation of the arrangement shown in FIG. 9.
Figure 10B:
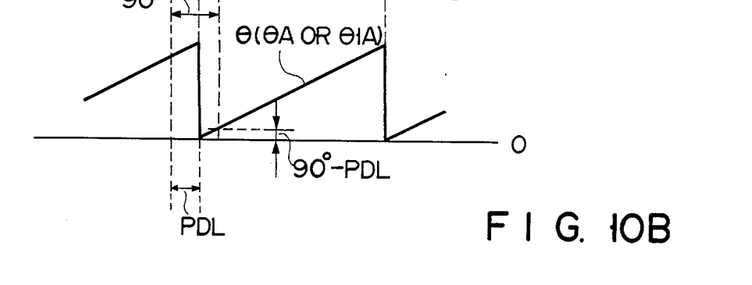

FIG. 9 is a block diagram showing a detailed arrangement of detectors 206 and 208 in FIG. 6 or detectors 206A and 208A in FIG. 7. FIGS. 10A and 10B are waveform charts for explaining the operation of the arrangement shown in FIG. 9 (in FIGS. 10A and 10B, $\theta$A and $\theta$B are represented by $\theta$.)

In FIG. 9, angle detection signal $\theta$A from resolver 14 (14A) is input to latch 2061 and adder 2063. Speed error signal $\omega$M ($\omega$1M) from band-pass filter 205 (205A) is input to zero cross sensor 2060 and sample & hold circuit 2080.

Zero cross sensor 2060 supplies latch pulse LP to latch 2061 at a timing at which signal $\omega$M crosses the zero level t10 in FIG. 10A). Thus, a value (90°−PDL in FIG. 10B) of angle detection signal $\theta$ at time t10 is loaded in latch 2061. Note that PDL indicates a phase difference between a maximum amplitude point of signal $\omega$M and the zero cross point of signal $\omega$M. Time t10 corresponds to a time phase-delayed by 90 degrees from the maximum amplitude point of signal $\omega$M.

The value (90°−PDL) of angle detection signal loaded in latch 2061 is input to adder 2062. In adder 2062, the value (90°−PDL) is added to fixed data equivalent to −90 degrees, whereby phase difference signal −PDL is obtained.

Phase difference signal −PDL is phase-inverted by inverting amplifier 2064 to be converted to phase difference signal PD (P1D).

Phase difference signal −PDL is added to angle detection signal $\theta$A ($\theta$1A) by adder 2063. If signal $\theta$A ($\theta$1A) is represented by $\theta$, adder 2063 outputs an angle signal equivalent to $\theta$−PDL. The most significant bit (MSB) of the angle signal ($\theta$−PDL) is supplied to sample & hold circuit 2080 as a sampling timing pulse. Sample & hold circuit 2080 samples speed error signal $\omega$M ($\omega$1M) at a time phase-advanced from the maximum point of the angle signal ($\theta$−PDL) by PDL and holds the sampling result. In this manner, amplitude signal A (A1) indicating amplitude $\omega$T·AL (FIG. 10A) of speed error signal $\omega$M ($\omega$1M) can be obtained from sample & hold circuit 2080.

While latch 2061 latches signal $\theta$A ($\theta$1A) and while sample & hold circuit 2080 holds speed error signal $\omega$M ($\omega$1M), phase difference signal PD (P1D) and amplitude signal A (A1) become constant DC values.

According to the above embodiments as described above, when an eccentricity occurs between an object to be detected and a resolver, an error having the same frequency as that of a moving amount of the object can be removed without the need to newly prepare a complicated compensation function.

Since the phase and amplitude of the movement error can be gradually detected uuring the operation of the object, a compensation signal can be generated without the need to reset the compensation function.

In this invention, since the compensation value is automatically calculated and is calibrated for eveyy predetermined period (T), a high-accuracy detection result ($\theta$RT, $\omega$T) can be obtained, from a statistical viewpoint, and the work load of the operator (e.g., manual correction of the compensation value) can be eliminated.

If detection signal $\theta$ has a repetition characteristic as that shown in FIG. 5, the present invention can be used for position or speed detection of an object other than a rotating member such as motor 10, provided that the speed of movement of the object is substantially constant during a prescribed interval (e.g., the interval from position PS to position PE in FIG. 3).

What is claimed is:

1. A high-accuracy position detection apparatus comprising:
    position detection means for detecting a position signal indicating a position of an object which is periodically and repetitively moved;
    coupling means for coupling said object to said position detection means with an eccentricity;
    coupling eccentricity detection means, connected to said position detection means, for detecting an eccentricity signal, corresponding to an eccentricity resulting from the coupling of said coupling means, from the position detection signal; and
    true position signal synthesizer means, connected to said position detection means and said coupling eccentricity detection means, for combining the position signal with the eccentricity signal, to provide a true position signal, which indicates a true position of said object and is independent of the coupling eccentricity of said coupling means.

2. An apparatus according to claim 1, wherein said coupling eccentricity detection means includes:
    linear function signal generation means for detecting a linear-approximation signal obtained by linear-approximating a change in the position signal during a repetitive movement period of said object, and for converting the linear-approximation signal into a linear function signal, obtained by linear approximation, when the coupling eccentricity is minimum; and
    deviation detection means for detecting a deviation of the position signal from said position detection means, with respect to the linear function signal, and outputting the deviation signal.

3. An apparatus according to claim 2, wherein said linear-approximation signal is defined by a line connecting a signal level of the position signal at a start point of the repetitive movement period of said object, and a signal level of the position signal at an end point of the repetitive movement period.

4. A high-accuracy position detection apparatus comprising:
    position detection means for detecting a position signal indicating a position of an object which is periodically and repetitively moved;
    coupling means for coupling said object to said position detection means with an eccentricity;
    coupling eccentricity detection means, connected to said position detection means, for detecting an eccentricity signal, corresponding to an eccentricity resulting from the coupling of said coupling means, from the position detection signal; and
    true position signal synthesizer means, connected to said position detection means and said coupling eccentricity detection means, for combining the position signal with the eccentricity signal, to provide a true position signal, which indicates a true position of said object and is independent of the coupling eccentricity of said coupling means;
    wherein said coupling eccentricity detection means includes:

linear function signal generation means for detecting a linear-approximation signal obtained by linear-approximating a change in the position signal during a repetitive movement period of said object, and for converting the linear-approximation signal into a linear function signal, obtained by linear approximation, when the coupling eccentricity is minimum, and deviation detection means for detecting a deviation of the position signal from said position detection means, with respect to the linear function signal, and outputting the deviation signal, wherein said linear-approximation signal is defined by a line connecting a signal level of the position signal at a start point of the repetitive movement period of said object, and a signal level of the position signal at an end point of the repetitive movement period, and wherein a line defined by the linear function signal is parallel to the line defined by the linear-approximation signal and the distance between these lines is obtained by the following equation:

$$\Delta P = \left[ \sum_{t=t0}^{t1} (\theta tn - ytn) \right] / (n-1)$$

where $\Delta P$ represents the distance between two parallel lines, n represents the number of same time divisions in the repetitive movement period, t0 represents time t at the start point, t1 represents time t at the end point, $\theta tn$ represnnts the signal level of the position signal at nth time tn, when the repetitive movement period is equally divided by n, and ytn represents the linear-approximation signal.

5. An apparatus according to claim 1, further comprising:

speed detection means for differentiating, with respect to time, the true position signal from said true position signal synthesizer means, and outputting a speed signal indicating a repetitive movement speed of said object.

6. An apparatus according to claim 5, wherein said coupling eccentricity detection means includes:

function generation means for converting a change in the position signal, during the repetitive movement period of said object, to a predetermined linear function signal, detecting a deviation of the position signal from said position detection means, with respect to the predetermined linear function signal, and outputting the eccentricity signal.

7. A high-accuracy position detection apparatus comprising:

position detection means for detecting a position signal indicating a position of an object which is periodically and repetitively moved;

coupling means for coupling said object to said position detection means with an eccentricity;

coupling eccentricity detection means, connected to said position detection means, for detecting an eccentricity signal, corresponding to an eccentricity resulting from the coupling of said coupling means, from the position detection signal;

true position signal synthesizer means, connected to said position detection means and said coupling eccentricity detection means, for combining the position signal with the eccentricity signal, to provide a true position signal, which indicates a true position of said object and is independent of the coupling eccentricity of said coupling means; and speed detection means for differentiating, with respect to time, the true position signal from said true position signal synthesizer means, and outputting a speed signal indicating a repetitive movement speed of said object;

wherein said coupling eccentricity detection means includes:

first means for differentiating, with respect to time, a change in the position signal during the repetitive movement period of said object, and generating a speed signal indicating a repetitive movement speed of said object;

second means, coupled to said first means, for extracting a component, resulting from the coupling eccentricity, from the speed signal, and generating an eccentricity error signal;

third means, coupled to said second means, for generating a phase difference signal indicating a phase difference between the eccentricity error signal and the position detection signal;

fourth means, coupled to said second means, for generating an amplitude signal indicating an amplitude of the eccentricity error signal; and fifth means, coupled to said third means and said fourth means, for generating an AC signal having the same period as the position signal, an amplitude determined by the amplitude signal and a phase determined by the phase difference signal.

8. An apparatus according to claim 7, wherein said third means includes:

latch pulse generation means for generating a latch pulse when the eccentricity error signal has reached a predetermined signal level;

latch means, connected to said latch pulse generation means, for latching the signal level of the position signal when the latch pulse is generated, and outputting a first phase signal;

first compensation means, connected to said latch means, for adding a predetermined compensation signal to the first phase signal, and outputting a second phase signal;

second compensation means, connected to said first compensation means, for adding the second phase signal to the position signal, and outputting a third phase signal; and means, connected to said first compensation means, for converting the second phase signal into a signal corresponding to the phase difference signal.

9. An apparatus according to claim 8, wherein said fourth means includes:

sample & hold means, connected to said second compensation means, for sampling the signal level of the eccentricity error signal when the third phase signal corresponds to a specific time during the repetitive movement period of said object, holding the sampled signal level, and outputting a signal corresponding to the amplitude signal.

10. A high-accuracy position detection apparatus comprising:

position detection means for detecting a position signal indicating a position of an object which is periodically and repetitively moved;

coupling means for coupling said object to said position detection means with an eccentricity ;

coupling eccentricity detection means, connected to said position detection means, for detecting an eccentricity signal, corresponding to an eccentricity resulting from the coupling said coupling means, from the position detection signal;

true position signal synthesizer means, connected to said position detection means and said coupling eccentricity detection means, for combining the position signal with the eccentricity signal, to provide a true position signal, which indicates a true position of said object and is independent of the coupling eccentricity of said coupling means; and speed detection meass for differentiating, with respect to time, the true position signal from said true position signal synthesizer means, and outputting a speed signal indicating a repetitive movement speed of said object;

wherein said coupling eccentricity detection means includes:

speed signal generation means for differentiating, with respect to time, changes in the position signal during a plurality of repetitive movement periods of said object, and generating a speed signal indicating a repetitive movement speed of said object;

frequency-divided signal generation means for frequency-dividing the position signal by the number of the plurality of the respective movement periods, and generating a frequency-divided signal;

eccentricity error signal generation means, coupled to said speed signal generation means and said frequency-divided signal generation means, for extracting a component, resulting from the coupling eccentricity, from the speed signal and the frequency-divided signal, and generating an eccentricity error signal;

phase difference signal generation means, coupled to said eccentricity signal generation means and said frequency-divided signal generation means, for generating a phase difference signal indicating a phase difference between the eccentricity error signal and the frequency-divided signal;

amplitude signal generation means, coupled to said eccentricity error signal generation means, for generating an amplitude signal indicating an amplitude of the eccentricity error signal; and AC signal generation means, coupled to said frequency-divided signal generation means, said phase difference signal generation means, and said amplitude signal generation means, for generating an AC signal having a period synchronous with the frequency-divided signal, an amplitude determined by the amplitude signal, and a phase determined by the phase difference signal.

11. An apparatus according to claim 10, further comprising:

means, connected to said speed signal generation means and said AC signal generation means, for generating the speed signal in correspondence with a product of the AC signal and the eccentricity error signal.

12. A position detection apparatus comprising:

position detection means for detecting a rotation position of a rotary member;

signal conversion means for converting a detection signal from said position detection means into an arbitrary conversion signal;

calculation deducting means for calculating and deducing a true rotation position of said rotary member, with reference to the conversion signal from said signal conversion means, and outputting a deduced signal;

compensation calculation menns for calculating a compensation signal for compensating for the conversion signal from said signal conversion means, based on the deduced signal from said calculation deducting means and the conversion signal from said signal conversion means; and compensation means for combining the compensation signal from said compensation calculation means with the conversion signal from said signal conversion means, and calculating a true rotation position signal of said rotary member.

13. A speed detection apparatus comprising:

movement amount detection means for detecting the amount of movement of an object;

speed calculation means for differentiating, with respect to time, a movement amount signal supplied from said movement amount detection means, and calculating a speed signal;

error detection means for detecting an error component included in the movement amount signal, based on the speed signal supplied from said speed calculation mans and the movement amount signal;

phase difference detection means for detecting a phase difference between an error signal supplied from said error detection means and the movement amount signal;

first filter means for filtering a predetermined frequency component of a phase difference signal supplied from said phase difference detection means;

amplitude detection means for detecting the amplitude of the error signal supplied from said error detection means;

second filter means for filtering another predetermined frequency component of an amplitude signal supplied from said amplitude detection means;

waveform generation means for generating a sine wave signal, based on a first filtered signal, supplied from said first filter means, a second filtered signal, supplied from said second filter means, and the movement amount signal from said movement amount detection means; and actual speed detection means for detecting, as the actual speed of said object, an actual speed signal from which the error component is removed, based on the sine wave signal from said waveform generation means and the movement amount signal from said movement amount detection means.

14. A speed detection apparatus comprising:

movement amount detection means for detecting aoount of movement of an object;

speed calculation means for differentiating, with respect to time, a movement signal supplied from said movement amount detection means, and calculating a speed signal;

frequency-dividing means for frequency-dividing the movement amount signal from said movement amount detection means;

error calculation means for calculating an error component included in the speed signal, based on the speed signal from said speed calculation means and a frequency-divided signal from said frequency-dividing means;

phase difference detection means for detecting a phase difference between the error signal supplied from said error calculation means and the frequency-divided signal from said frequency-dividing means;

first filter means for filtering a predetermined frequency component of a phase difference signal from said phase difference detection means;

amplitude calculation means for calculating an amplitude of the error signal from said error calculation means;

second filter means for filtering another predetermined frequency component of an amplitude signal supplied from said amplitude calculation means;

waveform generation means for generating a sine wave signal based on a first filtered signal, supplied from said first filter means, a second filtered signal, supplied from said second filter means, and the frequency-divided signal output from said frequency-dividing means; and actual speed calculation means for calculating, as the actual speed of said object, an actual speed signal from which the error component is removed, based on the sine wave signal from said waveform generation means and the speed signal from said speed calculation means.

* * * * *